2 Sheets--Sheet 1.

W. R. EVANS.

Assignor by mesne assignments to the Evans Rifle Manufacturing Co.

MAGAZINE GUN.

No. 7,635. Reissued April 24, 1877.

*Witnesses:*

Henry Eichling

Byron D. Cerill

*Inventor:*

Warren R. Evans

N. PETERS, PHOTO-LITHOGRAPHER, WASHINGTON, D. C.

W. R. EVANS.

Assignor by mesne assignments to the Evans Rifle Manufacturing Co.

MAGAZINE GUN.

No. 7,635. Reissued April 24, 1877.

*Witnesses:*

Henry Eichling.
Byron DeVenill

*Inventor:*

Warren R. Evans

N. PETERS, PHOTO-LITHOGRAPHER, WASHINGTON, D. C.

UNITED STATES PATENT OFFICE.

WARREN R. EVANS, OF THOMASTON, MAINE, ASSIGNOR, BY MESNE ASSIGNMENTS, TO THE EVANS RIFLE MANUFACTURING COMPANY.

IMPROVEMENT IN MAGAZINE-GUNS.

Specification forming part of Letters Patent No. 119,020, dated September 19, 1871; antedated September 16, 1871; reissue No. 7,635, dated April 24, 1877; application filed March 8, 1876.

*To all whom it may concern:*

Be it known that I, WARREN R. EVANS, of Thomaston, in the county of Knox, in the State of Maine, have invented a new and useful Improvement in Magazine-Guns, of which the following is a specification, reference being had to the accompanying drawings, forming part of the same, in which—

Figure 1:
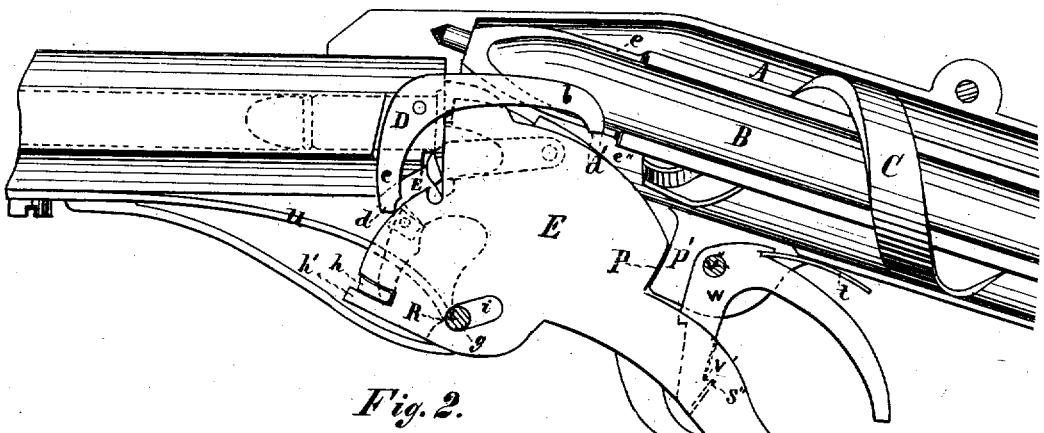
Figure 2:
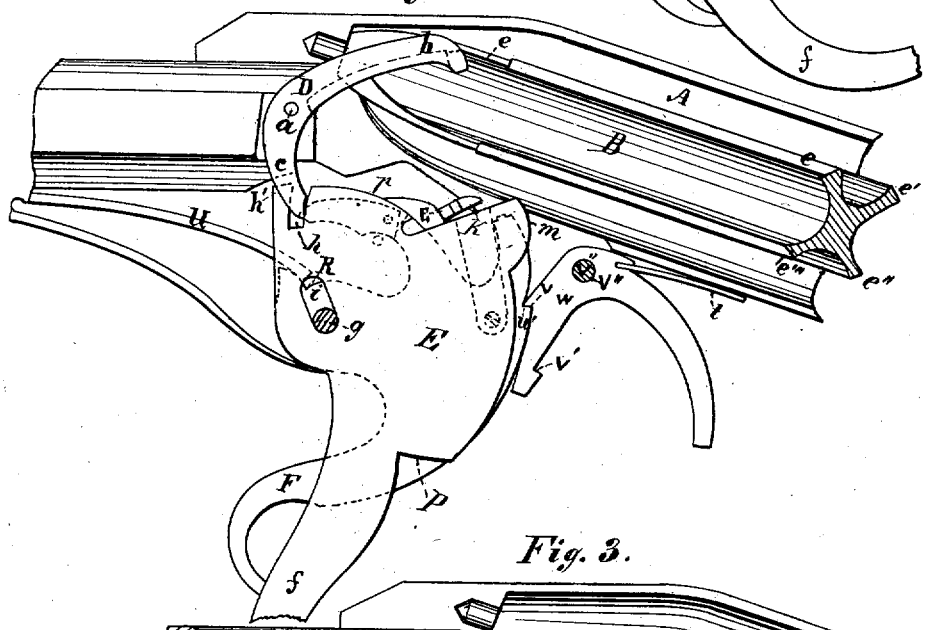
Figure 3:
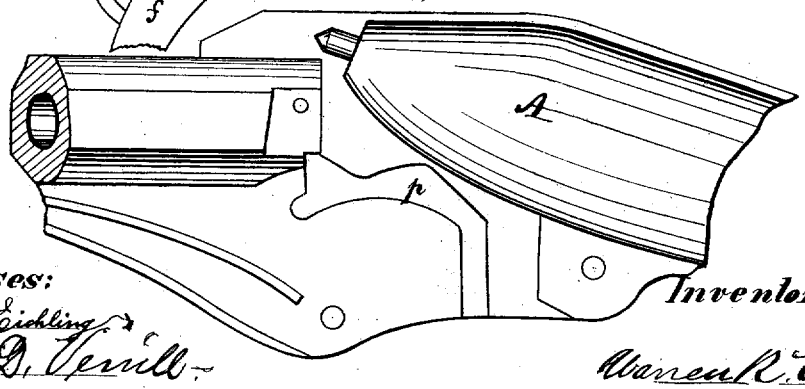
Figure 4:
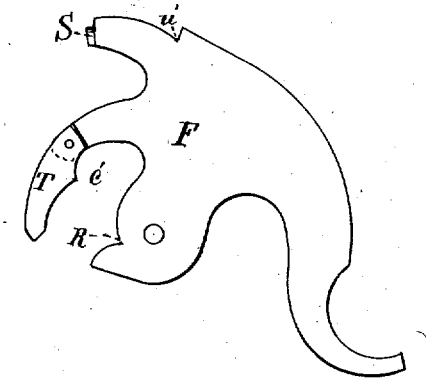
Figure 5:
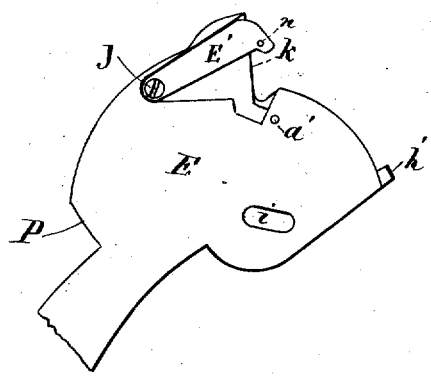
Figure 6:
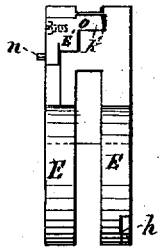
Figure 7:
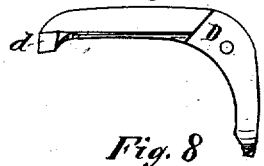
Figure 8:
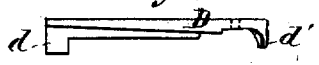
Figure 10:
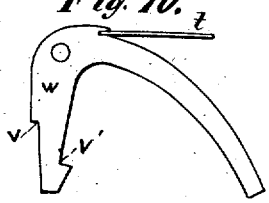
Figure 9:
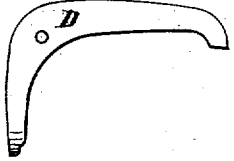

Figure 1 shows a side view of the gun-lock and a portion of the magazine and barrel, one side of the outer casing being removed, the parts being in position to close the breech of the barrel. Fig 2 is a similar view, showing the breech open. Fig. 3 is a view showing the inner surface of one side of the casing, with a piece of the barrel. Fig. 4 is a side view of the hammer. Fig. 5 is a view of the right side of the breech-block. Fig. 6 is a front edge view of the breech-block. Fig. 7 is a side view of the bell-crank lever for revolving the cartridge holder. Fig. 8 is an edge view of the same. Fig. 9 is a side view of the same, the reverse of Fig. 7; and Fig. 10 is a side view of the trigger.

This invention relates to a lock for a magazine-gun, and is specially designed to be used in connection with the magazine for which Letters Patent were issued to me December 8, 1868; and consists of the peculiar devices and combinations of devices hereinafter described and claimed.

A is the magazine; B, the cartridge-carrier, being a fluted or grooved cylinder, constructed to rotate in the magazine; and C a spiral coil fixed to the wall of the magazine, and surrounding the cylinder. These form the subject-matter of my patent above referred to, and are fully described therein.

It will be understood that this magazine and fluted cylinder extend back to the butt of the stock, where the cartridges are introduced within the magazine and into the grooves in the cylinder, they being thus pushed along the grooves in front of the coil toward the breech of the barrel by the revolving of the cylinder. There are, as appears by the drawings, four grooves in the said cylinder, and so, when the magazine is filled with cartridges, at every quarter revolution of the cylinder a cartridge is presented for insertion in the breech of the gun.

D is a bell-crank lever pivoted at *a*, the office of which is to rotate the cylinder B. Upon the inner face of the long end *b* of this lever is a projection, *d*, (seen plainly in Fig. 8,) which, by engagement successively with the ribs *e e′ e″ e‴* of the cylinder B, acts to rotate the latter, when the end *b* of said lever is thrown upward by the lever being rocked on its pivot *a*. Upon the lower end of the said lever is also a projection, *d′*, which engages a notch, *h*, in the lower angle of the breech-block.

E is the breech-block. It is composed of two walls or plates, having a space or recess between them. (See Fig. 6.) The breech-block terminates in the handle or lever *f*, and is pivoted on a screw-pin, *g*, secured in the casing of the lock, the opening *i* in the block, through which said pin passes, being slotted, forming an oblong hole, as shown in the drawings. *k* is the face of the breech-block, which closes the breech of the barrel when the block is in the position shown in Fig. 1. At the lower left-hand angle of the breech-block is formed a groove, *h*, cut into the left side face of the same, and immediately under the groove is a projection, *h′*. At the end of the short arm of the lever D is a lug or small projection, *d′*, Fig. 8, pointing inward. This is so arranged that when the breech-block is swung on its pivot in the act of opening the breech, the said projection *d′* will engage the projection *h′* in the block, and pass into the groove *h*, whereby, as the movement of the block is continued, the lever is rocked on its pivot, throwing up its long arm, the lug or projection on the end of the long arm engaging with one of the ribs *e*. By this means the said cylinder B has given to it a quarter turn each time the arm *b* of the lever D is thrown upward by the swinging of the breech-block into the position shown in Fig. 2.

*u* is the mainspring, secured at one end to the under side of the barrel, the other end engaging a notch, R, in the hammer F.

E′ is the cartridge-shell extractor. It consists of an arm pivoted in the breech-block at *j*, and which extends forward to the face K of the block, and then at right angles around across the said face far enough to engage with the flange of the butt of the cartridge-shell in the breech of the barrel, the upper edge of the part *o* extending across the block, being beveled to enable it to get in behind the said flange for engagement with it. In this extractor is a projecting pin, *n*, and in the inner face of one side of the lock-frame is cut a channel, *p*, which is traversed by the said pin, whereby the said extractor, when the breech-block is thrown down in the act of opening the breech, is thrown upward to engage with the cartridge-head, and thrown down out of the way of the said head, when the breech-block is swung upward in the act of closing the gun.

F is the hammer. A side view of it detached from the breech-block is shown by Fig. 4. In Figs. 1 and 2 it is shown in position between the walls of the breech-block, where it is pivoted by the screw which passes through the slotted opening *i* in said block. R is a notch which receives the mainspring *u*. S is the nose of the hammer that strikes the cartridge to produce the discharge, the hammer being drawn back or cocked, and then moving forward to strike the cartridge in the space between the two walls of the breech-block E.

T is an arm on the hammer, which serves to direct the course of the fresh cartridge, as it is advanced for insertion into the gun-barrel. *u'* is the cocking-notch in the hammer.

W is the trigger, pivoted to the lock-frame at *v''*, having secured to its upper edge the spring *t*, and having on its anterior edge a notch, *v*, which engages with the notch *u'* in the hammer for cocking the latter. On the opposite or posterior edge of the hammer is a notch, *v'*, which engages with a notch, *s''*, in the handle of the breech-block to assist in retaining the latter in position when closing the breech. This latter notch is formed in the handle of the said block at the rear end of the recess formed by the two walls of the block where they unite to form the solid handle. (Shown by dotted lines in Fig. 1.)

P is a large notch or shoulder in the rear edge of the breech-block, which, when the said block is in position to close the gun, rests directly in front of, and against, the anterior face of the abutment P', it being enabled to swing into such position after the recoil-face K of said block has reached contact with the breech of the barrel by means of the slotted opening *i* in the breech-block, the said opening permitting the movement on the pin *g* necessary to enable the shoulder P to swing into position in front of the said abutment P'. In this position the breech-block is securely locked, the recoil of the discharge being taken upon said abutment P'.

The operation of the mechanism is as follows: Suppose the piece is just discharged, the several parts are in the position shown in Fig. 1. The handle *f* is then thrown downward and forward. This movement opens the breech and cocks the hammer, which is carried with the breech-block, so that the notch *v* of the trigger is brought into engagement with the notch *u'* in the hammer. At the same time the tongue or arm T on the hammer is raised into a horizontal position, thereby serving as a guide for the next cartridge. Also, the case of the exploded cartridge is withdrawn by the extractor E', which is properly raised and moved for that purpose by the pin *n* in the slot *p*. Also, the lever D is rocked on its pivot, the long arm being thrown up, whereby a quarter revolution is given to the cylinder B, a cartridge being thus deposited on the tongue T ready for insertion in the breech. The empty cartridge-case is pushed out of an opening in the side of the case by the motion of the said cylinder B, the ascending rib of the same striking the said empty case and insuring its ejection.

What I claim as my invention, and desire to secure by Letters Patent, is—

1. The hammer, having the notch R, tongue T, and point S, all made to operate as and for the purpose described.

2. The combination of the fluted cylinder B, the spiral coil C, and the breech-block E, with the mechanism described, intermediate the said block and cylinder, whereby the said cylinder is rotated by the movement of said breech-block, all constructed to operate as and for the purpose described.

3. The combination of the lever D, the breech-block E, provided with the projection *h'*, and the rotating fluted cylinder B, as and for the purposes described:

4. The breech-block E, composed of two walls, with the space between them, and having the slotted hole *i* and the notch *s''*, as described.

5. The cartridge-extractor E, pivoted to the breech-block, and provided with a pin or projection, *n*, made to work in the slot *p* in the inner face of the lock-casing, as and for the purpose described.

6. The combination of the hammer F, the breech-block E arranged therein, as described, and trigger W, mainspring *u*, and lever *f*, as and for the purpose specified.

In witness whereof I have hereto set my hand this 1st day of March, 1876.

WARREN R. EVANS.

Witnesses:
BYRON D. VENILL,
GEORGE L. REED.